United States Patent
Nishanov et al.

(10) Patent No.: US 10,177,994 B2
(45) Date of Patent: Jan. 8, 2019

(54) FAULT TOLERANT FEDERATION OF COMPUTING CLUSTERS

(71) Applicant: Microsoft Technology Licensing, LLC, Redmond, WA (US)

(72) Inventors: Gor Nishanov, Redmond, WA (US); Andrea D'Amato, Kirkland, WA (US); David Allen Dion, Bothell, WA (US); Amitabh Prakash Tamhane, Redmond, WA (US); Lokesh Srinivas Koppolu, Redmond, WA (US); Nicholas Maliwacki, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 87 days.

(21) Appl. No.: 14/459,066

(22) Filed: Aug. 13, 2014

(65) Prior Publication Data

US 2016/0050123 A1 Feb. 18, 2016

(51) Int. Cl.
| | |
|---|---|
| H04L 12/24 | (2006.01) |
| H04L 29/08 | (2006.01) |
| G06F 9/50 | (2006.01) |

(52) U.S. Cl.
CPC ........ H04L 41/5003 (2013.01); G06F 9/5061 (2013.01); H04L 67/10 (2013.01)

(58) Field of Classification Search
CPC .............. H04W 84/20; H04W 56/0015; H04L 41/0803; H04L 67/1097; G06F 11/2094;
(Continued)

(56) References Cited

U.S. PATENT DOCUMENTS

| | | |
|---|---|---|
| 5,533,039 A | 7/1996 | Boyer |
| 7,480,256 B2 | 1/2009 | Akyol et al. |

(Continued)

FOREIGN PATENT DOCUMENTS

| | | |
|---|---|---|
| EP | 0464014 | 1/1992 |
| WO | WO2006135466 | 12/2006 |

OTHER PUBLICATIONS

Aoki, et al., "Autonomically-Adapting Master-Worker Programming Framework for Multi-Layered Grid-of-Clusters", In Proceedings of HPC Asia, Jan. 2007, 8 Pages.

(Continued)

*Primary Examiner* — Tonia L Dollinger
*Assistant Examiner* — Kristoffer L S Sayoc
(74) *Attorney, Agent, or Firm* — Workman Nydegger

(57) ABSTRACT

Embodiments are directed to organizing computing nodes in a cluster federation and to reassigning roles in a cluster federation. In one scenario, a computer system identifies computing nodes that are to be part of a cluster federation which includes a master cluster and worker clusters. The computer system assigns a director role to a master node in the master cluster which governs decisions that affect consistency within the federation, and further assigns a leader role to at least one master node which monitors and controls other master nodes in the master cluster. The computer system assigns a worker agent role to a worker node which receives workload assignments from the master cluster, and further assigns a worker role to a worker node which processes the assigned workload. The organized cluster federation provides fault tolerance by allowing roles to be dynamically reassigned to computing nodes in different master and worker clusters.

21 Claims, 8 Drawing Sheets

(58) Field of Classification Search
CPC .............. G06F 11/2023; G06F 11/203; G06F 17/30575
USPC ........................................ 709/223, 208, 209
See application file for complete search history.

(56) References Cited

U.S. PATENT DOCUMENTS

| | | | |
|---|---|---|---|
| 7,706,361 | B2 | 4/2010 | McMillen et al. |
| 7,987,152 | B1 | 7/2011 | Gadir |
| 8,316,113 | B2 | 11/2012 | Linden et al. |
| 8,621,054 | B2 | 12/2013 | Maruyama et al. |
| 2004/0199512 | A1 | 10/2004 | Cornwell et al. |
| 2005/0188075 | A1* | 8/2005 | Dias ................... H04L 67/1008 709/224 |
| 2005/0237926 | A1 | 10/2005 | Cheng et al. |
| 2006/0053216 | A1* | 3/2006 | Deokar ............... G06F 21/6218 709/223 |
| 2006/0136929 | A1 | 6/2006 | Miller |
| 2009/0193059 | A1* | 7/2009 | Wall ..................... G06F 11/2094 |
| 2009/0225763 | A1* | 9/2009 | Forsberg ............. H04L 12/5695 370/401 |
| 2010/0162036 | A1 | 6/2010 | Linden et al. |
| 2010/0198955 | A1 | 8/2010 | Maruyama et al. |
| 2011/0228668 | A1* | 9/2011 | Pillai .................. G06F 11/2023 370/217 |
| 2012/0166645 | A1 | 6/2012 | Boldyrev et al. |
| 2012/0209937 | A1 | 8/2012 | Bacher et al. |
| 2012/0297249 | A1 | 11/2012 | Yang et al. |
| 2014/0007092 | A1 | 1/2014 | Barbee |
| 2014/0047342 | A1 | 2/2014 | Breternitz et al. |
| 2014/0053149 | A1 | 2/2014 | Wu et al. |
| 2014/0149485 | A1 | 5/2014 | Sharma et al. |
| 2016/0050123 | A1 | 2/2016 | Nishanov et al. |
| 2016/0050262 | A1 | 2/2016 | Kumar et al. |

OTHER PUBLICATIONS

"International Search Report & Written Opinion Issued in PCT Application No. PCT/US2015/044313", dated Nov. 13, 2015, 11 Pages.
Office Action dated Aug. 29, 2016 cited in U.S. Appl. No. 14/459,072.
"International Preliminary Report on Patentability Issued in PCT Application No. PCT/US2015/044398", dated Aug. 30, 2016, 7 Pages.
"International Preliminary Report on Patentability Issued in PCT Application No. PCT/US2015/044313", dated Oct. 11, 2016, 8 Pages.
"Second Written Opinion Issued in PCT Application No. PCT/US2015/044398", dated Jun. 6, 2016, 6 Pages.
"International Search Report & Written Opinion issued in PCT Application No. PCT/US2015/044398", dated Jan. 25, 2016, 20 pages.
"Second Written Opinion Issued in PCT Application No. PCT/US2015/044313", dated May 30, 2016, 5 Pages.
Office Action dated Feb. 23, 2017 cited in U.S. Appl. No. 14/459,072.
"Office Action cited in U.S. Appl. No. 14/459,072 dated Feb. 12, 2018".
Office Action dated Oct. 13, 2017 cited in U.S. Appl. No. 14/459,072.
"Ofiice Action Issued in European Patent Application No. 15750596.7", dated Apr. 12, 2018, 5 Pages.
Tu, et al., "Speedy Transactions in Multicore in-memory Databases", In Proceedings of the ACM Twenty-Fourth Symposium on Operating Systems Principles, Jan. 1, 2013, 15 Pages.
"Office Action Issued in European Patent Application No. 15750599.1", dated Aug. 21, 2018, 8 Pages.
"Final Office Action Issued in U.S. Appl. No. 14/459,072", dated Aug. 31, 2018, 20 Pages.

* cited by examiner

FAULT TOLERANT FEDERATION OF COMPUTING CLUSTERS

CROSS-REFERENCE TO RELATED APPLICATIONS

This application is related to co-pending U.S. patent application Ser. No. 14/459,072, entitled "Scalable Fault Resilient Communications within Distributed Clusters", filed on Aug. 13, 2014.

BACKGROUND

Computing systems have become ubiquitous, ranging from small embedded devices to phones and tablets to PCs and backend servers. Each of these computing systems is designed to process software code. The software allows users to perform functions, interacting with the hardware provided by the computing system. In some cases, these computing systems may be linked together to form a cloud of computing resources. These cloud resources may include hosting, processing, data storage or other services. These cloud resources are designed to be fault tolerant such that one computing system can immediately replace another when needed. Such fault tolerant systems, however, may generate large amounts of intra-cloud network traffic ensuring that systems are functioning properly.

BRIEF SUMMARY

Embodiments described herein are directed to organizing computing nodes in a cluster federation and to reassigning roles in a cluster federation. In one embodiment, a computer system identifies computing nodes that are to be part of a cluster federation. The cluster federation includes a master cluster and worker clusters. The master cluster includes master nodes which are computing nodes to which a master role is assigned, and the worker cluster includes worker nodes which are computing nodes to which a worker role is assigned. The computer system assigns a director role to a master node in the master cluster. The director role governs decisions that affect consistency within the federation including controlling master nodes in the master cluster, and further assigns a leader role to at least one master node which monitors and controls worker nodes in the worker cluster. The computer system further assigns a worker agent role to at least one worker node in the worker cluster. The worker agent role receives workload assignments from the master cluster, and further assigns a worker role to at least one worker node which processes the assigned workload. As such, the organized cluster federation provides fault tolerance for the master and worker clusters by allowing roles to be dynamically reassigned to computing nodes in different master and worker clusters.

In another embodiment, a computer system reassigns roles in a cluster federation. The computer system determines that a master cluster in the cluster federation is to maintain a specified number of master nodes or a specified distribution of master nodes across fault domains. The master nodes are computing nodes to which master roles are assigned, and the cluster federation includes a master cluster and worker clusters. The computer system determines that the master cluster is below the specified number of master nodes and further determines that at least one worker node in a worker cluster is available for reassignment as a master node, where the worker node is a computing node to which a worker role is assigned. The computer system then reassigns the determined worker node to a master node, so that the former worker node now functions as a master node.

In yet another embodiment, a computer system reassigns roles in a cluster federation in a different manner. The computer system determines that a worker cluster in the cluster federation is to maintain a specified number of worker nodes, where the worker nodes are computing nodes to which worker roles are assigned, and where the cluster federation includes a master cluster and worker clusters. The computer system determines that the worker cluster is below the specified number of worker nodes and further determines that at least one master node in a master cluster is available for reassignment as a worker node, where the master node is a computing node to which a master role is assigned. The computer system then reassigns the determined master node to a worker node, so that the former master node now functions as a worker node.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Figure 1:
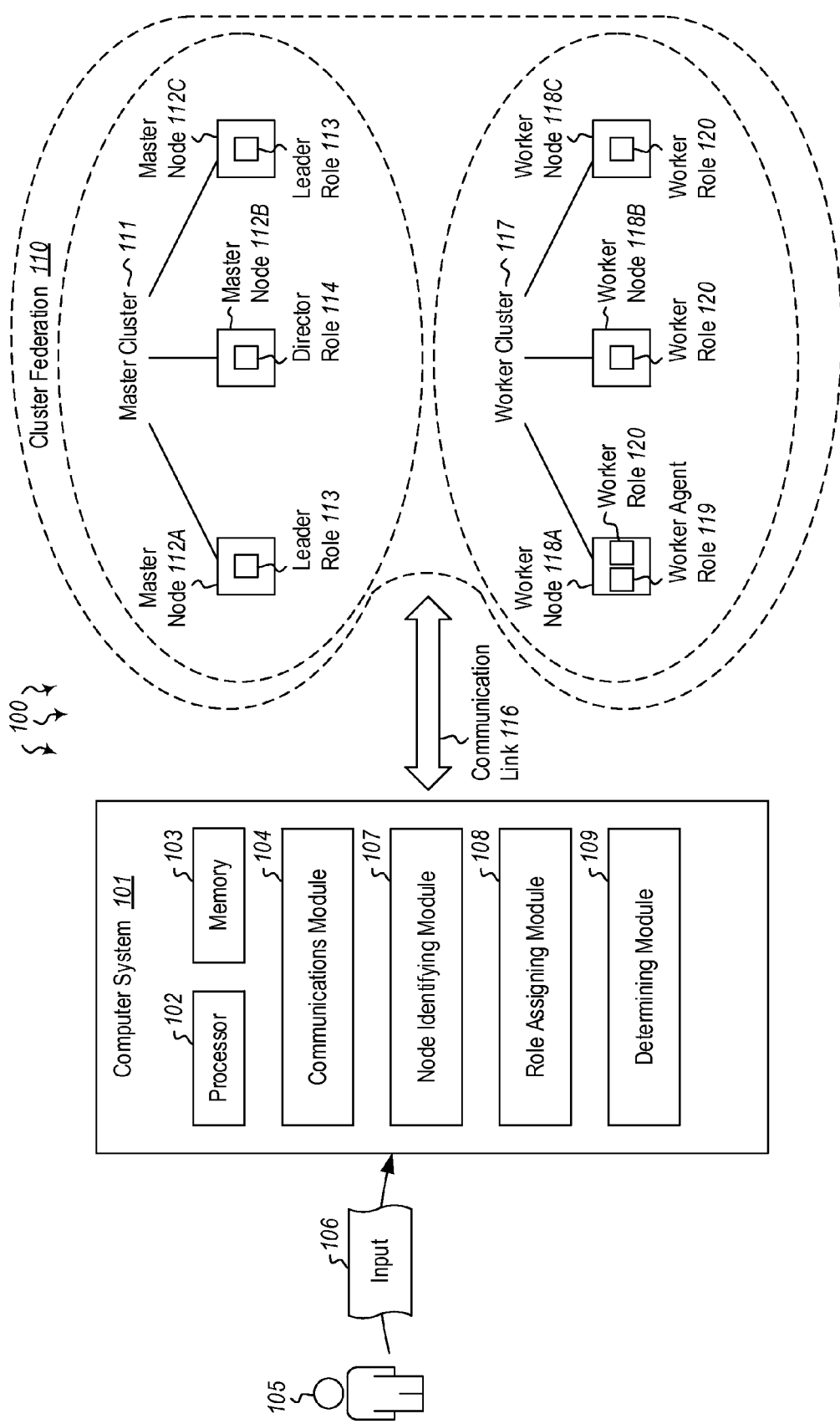
FIG. 1 illustrates a computer architecture in which embodiments described herein may operate including organizing computing nodes in a cluster federation.

Embodiments described herein are directed to organizing computing nodes in a cluster federation and to reassigning roles in a cluster federation. In one embodiment, a computer system identifies computing nodes that are to be part of a cluster federation. The cluster federation includes a master cluster and worker clusters. The master cluster includes master nodes which are computing nodes to which a master role is assigned, and the worker cluster includes worker nodes which are computing nodes to which a worker role is assigned. The computer system assigns a director role to a master node in the master cluster. At least in some embodiments, there is only one director on each master cluster. A director can be absent for a brief time period when a node hosting a director has failed and the master cluster is in the process of reassigning the director role to a different master node. The director role governs decisions that affect consistency within the federation including controlling master nodes in the master cluster, and further assigns a leader role to at least one master node which monitors and controls worker nodes in the worker cluster. The computer system further assigns a worker agent role to at least one worker node in the worker cluster. The worker agent role receives workload assignments from the master cluster, and further assigns a worker role to at least one worker node which processes the assigned workload. As such, the organized cluster federation provides fault tolerance for the master and worker clusters by allowing roles to be dynamically reassigned to computing nodes in different master and worker clusters.

In another embodiment, a computer system reassigns roles in a cluster federation. The computer system determines that a master cluster in the cluster federation is to maintain a specified number of master nodes or a specified distribution of master nodes across fault domains. The master nodes are computing nodes to which master roles are assigned, and the cluster federation includes a master cluster and worker clusters. The computer system determines that the master cluster is below the specified number of master nodes and further determines that at least one worker node in a worker cluster is available for reassignment as a master node, where the worker node is a computing node to which a worker role is assigned. The computer system then reassigns the determined worker node to a master node, so that the former worker node now functions as a master node.

In yet another embodiment, a computer system reassigns roles in a cluster federation in a different manner. The computer system determines that a worker cluster in the cluster federation is to maintain a specified number of worker nodes, where the worker nodes are computing nodes to which worker roles are assigned, and where the cluster federation includes a master cluster and worker clusters. The computer system determines that the worker cluster is below the specified number of worker nodes and further determines that at least one master node in a master cluster is available for reassignment as a worker node, where the master node is a computing node to which a master role is assigned. The computer system then reassigns the determined master node to a worker node, so that the former master node now functions as a worker node.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments described herein may implement various types of computing systems. These computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. A computing system may be distributed over a network environment and may include multiple constituent computing systems.

As illustrated in FIG. 1, a computing system 101 typically includes at least one processing unit 102 and memory 103. The memory 103 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

As used herein, the term "executable module" or "executable component" can refer to software objects, routines, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 103 of the computing system 101. Computing system 101 may also contain communication channels that allow the computing system 101 to communicate with other message processors over a wired or wireless network.

Embodiments described herein may comprise or utilize a special-purpose or general-purpose computer system that includes computer hardware, such as, for example, one or more processors and system memory, as discussed in greater detail below. The system memory may be included within the overall memory 103. The system memory may also be referred to as "main memory", and includes memory locations that are addressable by the at least one processing unit 102 over a memory bus in which case the address location is asserted on the memory bus itself. System memory has been traditionally volatile, but the principles described herein also apply in circumstances in which the system memory is partially, or even fully, non-volatile.

Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical hardware storage media that store computer-executable instructions and/or data structures. Physical hardware storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the principles described herein may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

FIG. 1 illustrates a computer architecture 100 in which at least one embodiment may be employed. Computer architecture 100 includes computer system 101. Computer system 101 may be any type of local or distributed computer system, including a cloud computing system. The computer system 101 includes modules for performing a variety of different functions. For instance, the communications module 104 may be configured to communicate with other computing systems. The communications module 104 may include any wired or wireless communication means that can receive and/or transmit data to or from other computing systems. The communications module 104 may be configured to interact with databases, mobile computing devices (such as mobile phones or tablets), embedded or other types of computing systems.

The computer system 101 may include other modules including the node identifying module 107, the role assigning module 108 and the determining module 109. In some embodiments, an administrative or other user 105 may desire to organize a group of computing nodes into a federated cluster (e.g. 110). The user 105 may provide input 106 indicating how many nodes of each type are to be in the cluster federation 110. As the term is used herein, a "cluster federation" or "federated cluster" is an aggregation of multiple independent clusters collaborating together to provide federation-wide services and also retain an ability of individual clusters to continue operating even during loss of connection with other cluster and/or failure of other clusters. Each cluster is made up of one or more physical computing nodes which may include computing systems such as server blades, hardware processors or processing cores, mainframe, embedded or other types of computing systems. Thus, clusters are collections of computing systems that work together to run workloads and fail over as needed to provide fault tolerance. The cluster federation may include various types of clusters including master clusters and worker clusters.

A "master cluster" as referred to herein is a cluster that runs software components that are responsible for monitoring worker clusters and making failover decisions. A "worker cluster" as referred to herein is a cluster that runs assigned workloads. The worker cluster will attempt local failover within the nodes of the worker cluster. If the worker cluster fails to transfer the workload, a master cluster can be used to host the workload. A "leader role" is a software component hosted on a master cluster that implements the control and monitoring logic of the federation. A "worker agent" is a software component hosted on a worker cluster which accepts assignments from the master cluster and provides status updates to a master cluster. A "workload" is a software application or service or other portion of code running on a cluster node that can be failed over to other cluster nodes as needed. "Failing over" includes the ability to quickly transfer a workload from one cluster node to another in case of a failure, or to a more desirable cluster node for performance, load balancing or other reasons.

Embodiments herein federate clusters of any type and can be used with substantially any clustering solutions that allow workloads to be hosted on computing nodes and provide failover of workloads in case of hardware or software failures. The embodiments provide a fault tolerant store (e.g. a cluster database) that allows agents running on a master cluster to persist information used to run the cluster federation 110. Master agent software hosted on a master cluster may be split into a director component which is active only at one master cluster node at a time, and leader components which monitor and control other nodes, and which are active on other cluster nodes. Thus, as shown in FIG. 1, master cluster 111 may have multiple different master nodes (including 112A, 112B, 112C and others (not shown)), one of which has a director role 114 (master node 112B), while master node 112A has a leader role 113 and master node 112C has a leader role 113. As will be described further below, worker nodes and master nodes may have different roles assigned to them at different times, and the computing nodes themselves may be reassigned to being worker nodes or master nodes.

The director role 114 (or simply "director" hereinafter) is configured to make decisions including, but not limited to, the following: 1) Which leaders are responsible for which worker clusters, 2) Which worker nodes are responsible for hosting which workloads, 3) Deciding to promote a node from a worker cluster to withdraw from its current worker cluster and join a master cluster, or to demote a master node so that it becomes a worker node and joins a worker cluster. This allows a nearly instant replacement of a failed computing node on master or worker cluster from the pool of computing nodes in their respective clusters. The director role records its decisions in a cluster database (which may be local or remote to the master cluster. Leader roles (or "leaders" hereinafter) monitor changes to the cluster database and learn whether they need to communicate director decisions to the worker clusters they are responsible for. Leaders send assignments to worker clusters and receive status updates from worker nodes. If a leader has not received a status update within a predetermined time out interval (whether measured in seconds, minutes, hours, etc.), the leader will interpret the lack of response as a failure and will record the failure in the cluster database.

In some embodiments, the director 114 may learn about the failure of a worker and decide on how to redistribute workloads hosted by the worker. Once the decision regarding redistribution of workloads has been made, the director will record the decision in the cluster database. Leaders may then learn about the new workload and communicate that to the worker clusters they are responsible for. In the case of a leader failure, the director may learn about it via a notification delivered by the master cluster 111 which reports on master node down or up events. When the director learns about a master node failure, the director redistributes worker cluster nodes monitored by that particular master cluster node among the remaining master cluster nodes. The director then writes this decision in the master database. Leaders will learn about the decision via database notification changes and start monitoring and controlling newly acquired worker clusters.

When a failed master cluster node comes back online, it informs the director 114 that it is available for monitoring by recording its state as online in the cluster database. The master learns about this and redistributes some worker clusters to a new master cluster node to better spread the monitoring and controlling load on master cluster nodes. If a failed master cluster node is not coming online in a predetermined period of time, and the number of active master cluster nodes falls below the desired threshold number of active master cluster nodes, the director can choose to remove a node from a worker cluster and join it to the master cluster to a retain desired degree of redundancy in the master cluster 111. The opposite operation is also possible, if the number of worker clusters monitored is small, the director can choose to remove a node from the master cluster and rejoin a worker cluster 117 (or form a new worker cluster). Worker clusters can be one node clusters or multi-node clusters. In multi-node worker clusters, a failed workload will be attempted to be restarted on other nodes of the worker cluster. Once recovery attempts by the worker cluster are exhausted, a worker agent running on a worker cluster can request master cluster help with transferring the failed workload elsewhere.

In some embodiments, a database may be partitioned to allow the director and leaders to communicate by changing entries in the database. Database columns may be partitioned to prevent conflicts, such that any particular value is allowed to be changed by only one entity existing on the cluster. For example, for a given workload, there may be an "Intended State" field and a "Current State" field. The intended state may only be changed by a director which is only active on one cluster node in a master cluster. The current state may be changed by the leader responsible for the worker that is hosting that workload (this ratio is one-to-one in a master cluster). Thus, by partitioning the data in such a fashion, leader and director components may interact with each other without having to acquire database locks or any other synchronization mechanisms. Communication between directors and leaders, promotion and demotion of nodes within a cluster, and organizing nodes into a fault tolerant cluster will be described further below with regard to methods 200, 300 and 400 of FIGS. 2, 3 and 4, respectively.

Figure 2:
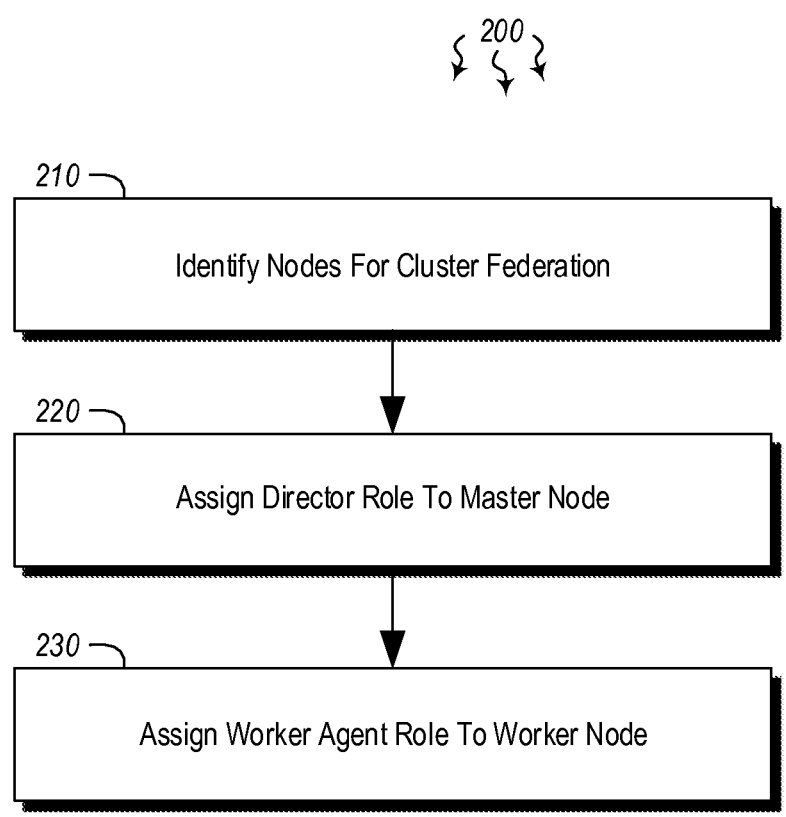
FIG. 2 illustrates a flowchart of an example method for organizing computing nodes in a cluster federation.
Figure 3:
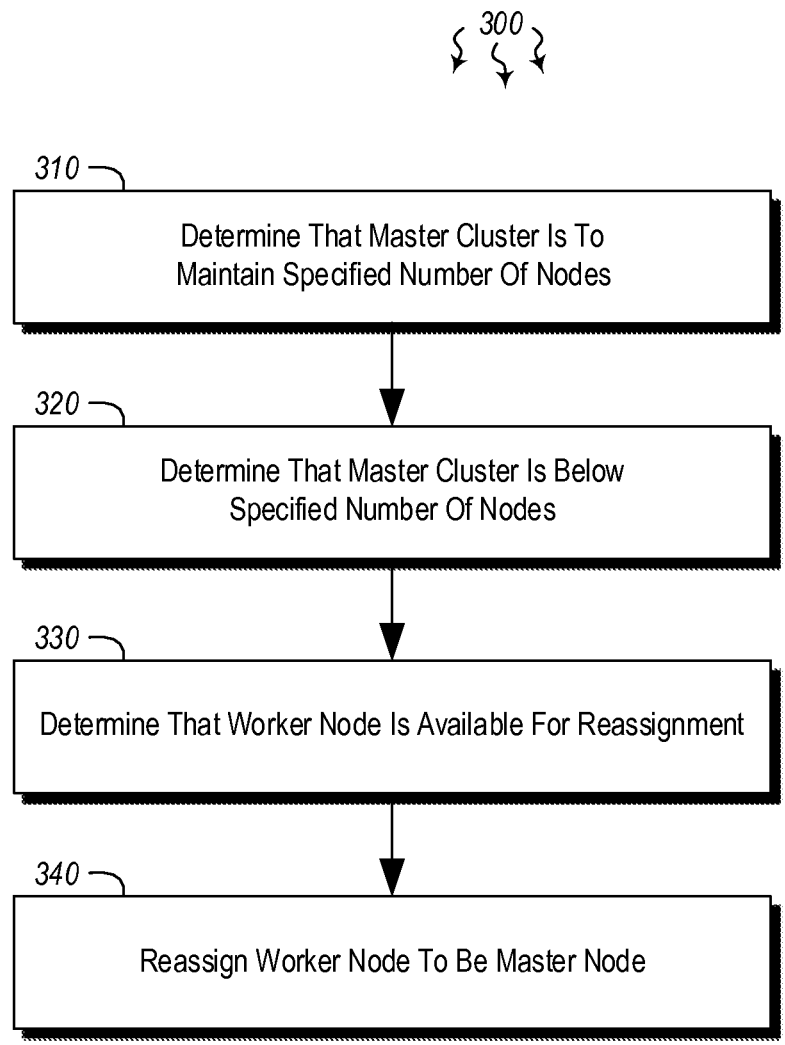
FIG. 3 illustrates a flowchart of an example method for reassigning roles in a cluster federation.
Figure 4:
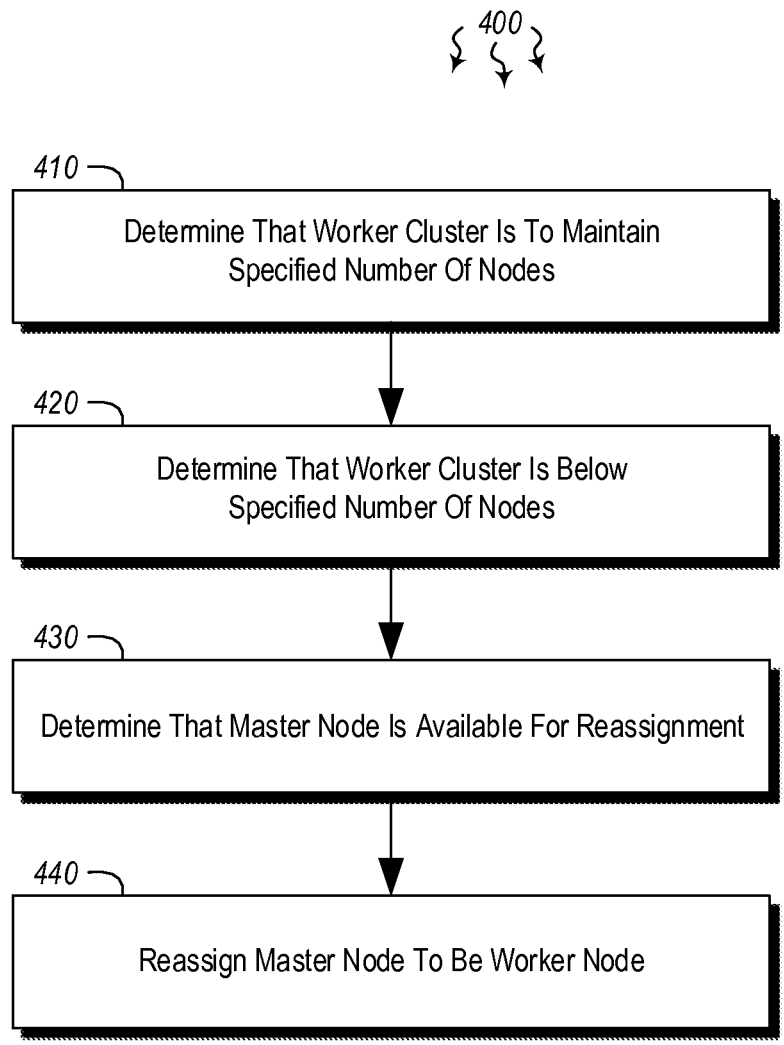
FIG. 4 illustrates a flowchart of an alternative example method for reassigning roles in a cluster federation.

In view of the systems and architectures described above, methodologies that may be implemented in accordance with the disclosed subject matter will be better appreciated with reference to the flow charts of FIGS. 2, 3 and 4. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for organizing computing nodes in a cluster federation. The method 200 will now be described with frequent reference to the components and data of environment 100.

Method 200 includes an act of identifying one or more computing nodes that are to be part of the cluster federation, the cluster federation including at least one master cluster and at least one worker cluster, the master cluster including at least one master node comprising a computing node to which a master role is assigned, the worker cluster including at least one worker node comprising a computing node to which a worker role is assigned (act 210). For example, the node identifying module of computing system 101 may identify nodes including master nodes 112A-C and worker nodes 118A-C that are to be part of cluster federation 110. The cluster federation includes a master cluster 111 and one or more worker clusters 117. One of the master nodes is assigned to be director 114 (master node 112B in FIG. 1), while the other master nodes have leader roles 113. The nodes of the cluster federation 110 may communicate with the computer system 101 via communication link 116. While shown as being separate from the cluster federation 110, it will be understood that computer system 101 may be part of the cluster federation and may itself be a master or worker node.

As mentioned above, the worker nodes (118A-C) are configured to process assigned workloads. These workload assignments may be stored on the worker nodes such that if all of the worker nodes were to go out and reboot, the worker nodes could look to their stored assignments and continue processing, without consulting the master cluster. Accordingly, the worker nodes may continue operating in the absence of the master cluster 111, whether due to a communication failure, due to a total failure of a master node, due to a software failure or for any other reason. Allowing the worker nodes to store their assigned workloads makes the cluster federation more robust in the face of failures, and allows progress to be made even when communication with the master cluster is lost.

Method 200 further includes an act of assigning a director role to a master node in the master cluster, the director role governing decisions that affect consistency within the federation, and further assigning a leader role to at least one master node which monitors and controls other master nodes in the master cluster (act 220). The role assigning module 108 of computer system 101 may assign director role 114 to master node 112B, for example, in master cluster 111. The director makes decisions that affect consistency, meaning that it controls situations where conflicts may arise such as which workloads have been assigned to which worker clusters, or which worker clusters have been assigned to which master nodes. Thus, if a decision is to be made that could be made two different ways by different parties, the director will assume responsibility for that decision and will be the sole arbiter for that decision, thereby avoiding conflicts. In this manner, the director role may ensure that each workload is only processed by one node at a time, thereby avoiding the conflicting results that would occur if two nodes were to process the workload (either simultaneously or subsequently).

The director role 114 may be assigned to any master node in the cluster federation 110. If that master node were to fail, the director role may be transferred to another master node in the master cluster 111 (e.g. node 112C). The administrator 105 or other user may establish a policy for the director, indicating which master nodes are to assume the director role initially or upon failure of another master node. The administrator may also override any existing policy by manually assigning the director role to a specified node. An administrator may also establish a specified number of master or worker nodes that are to be maintained for fault tolerance. If the number for any cluster becomes too low, master or worker nodes may be promoted or demoted to ensure the number of nodes established by the administrator for fault tolerance is maintained.

Method 200 also includes an act of assigning a worker agent role to at least one worker node in the worker cluster, the worker agent role receiving workload assignments from the master cluster, and further assigning a worker role to at least one worker node which processes the assigned workload, wherein the organized cluster federation provides fault tolerance for the master and worker clusters by allowing roles to be dynamically reassigned to computing nodes in different master and worker clusters (act 230). The role assigning module 108 of computer system 101 may, for example, assign worker agent role 119 to worker node 118A, and assign worker roles 120 to worker nodes 118B and 118C. These worker nodes may process workloads that are assigned to them. The worker agent may be configured to report back to the leader and provide status updates for the various workloads that are being processed by that worker cluster 117.

Figure 6B:
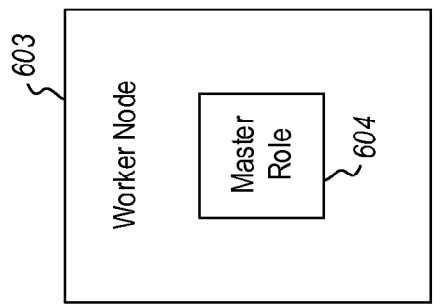
FIG. 6B illustrates an embodiment in which a master role is instantiated on a worker node.
Figure 6A:
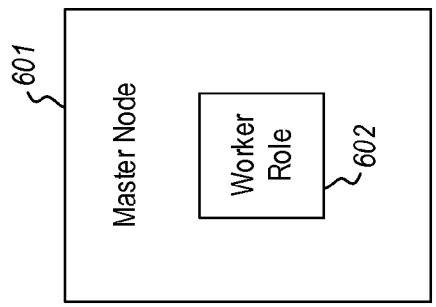
FIG. 6A illustrates an embodiment in which a worker role is instantiated on a master node.

In some embodiments, the cluster federation 110 may perform certain steps to balance processing load across the various clusters of the federation. For example, as shown in FIG. 6A, a worker role 602 may be assigned to a master node 601. Thus, as part of the worker role, various workload assignments may be hosted on the master node in the master cluster. This may be advantageously performed in cases where a master node is light on work and has available processing resources. These resources may be used to process workloads associated with the worker role. Similarly, in FIG. 6B, a master role 604 may be assigned to worker node 603. While assigned the master role 604, the worker node 603 may perform functions normally associated with a master node, such as monitoring and controlling worker nodes in a worker cluster. Thus, in this manner, the role assigning module 108 of FIG. 1 may assign and reassign roles as needed within the cluster federation 110. These roles may be reassigned according to policy or at the direction of an administrator or other user.

In some cases, the role or functionality assigned to a master node may be distributed among multiple master nodes in the master cluster 111. For instance, functionality such as monitoring worker nodes or sending indications of updated workloads may be distributed among master nodes 112A and 112C in master cluster 111 or among other master nodes (not shown). In this manner, leader role 113 functionality may be distributed over multiple master nodes to balance the load. In some cases, the master node functionality may be distributed along physical hardware boundaries to reduce network traffic between computing systems. For example, one master node may be allocated to each hardware rack to monitor worker clusters within the same hardware rack. This may reduce or eliminate cross rack network traffic.

Figure 8:
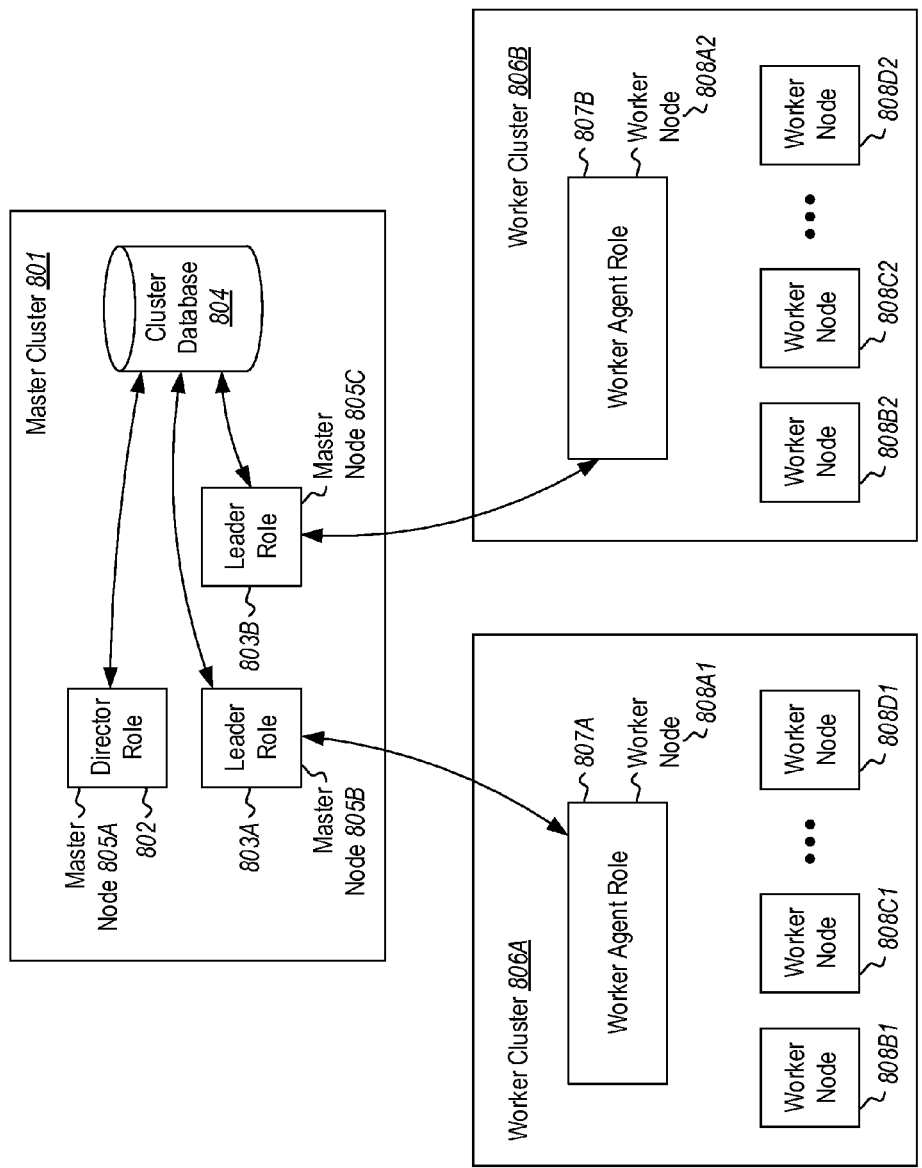
FIG. 8 illustrates an embodiment in which leader roles of a master cluster communicate with worker agent roles of worker clusters.

Worker agents may be configured to communicate with master agents on master nodes. The worker agent may communicate with the master agent on behalf of its corresponding worker cluster. Thus, as shown in FIG. 8, a leader role 803A may be assigned to master node 805B and another leader role 803B may be assigned to master node 805C, while the director role 802 is assigned to master node 805A. The leader roles may communicate with their respective worker agent roles (807A and 807B) on worker nodes 808A1 and 808A2, respectively. The worker agent roles may receive workload updates for their respective worker nodes. For instance, worker agent role 807A may receive communications from master node 805B on behalf of the worker nodes of worker cluster 806A (e.g. 808B1, 808C1, 808D1, etc.), while worker agent role 807B may receive communications from master node 805C on behalf of the worker nodes of worker cluster 806B (e.g. 808B2, 808C2, 808D2, etc.). The communications may include workload assignment status updates as well as receiving additional workload assignments or removing workload assignments. The leaders may send out the communications at the direction of the director 802. The director may communicate with the leaders by changing data values within the cluster 804 of the master cluster 801.

In some cases, the leader 803A may instruct the worker agent role 807A to transfer a given workload from one worker node to another worker node. Such a transfer may occur, perhaps, when the leader determines from health update data that a worker node has become unhealthy. In other cases, worker nodes in the worker cluster 806A may transfer assigned workloads between other worker nodes in the worker cluster without the knowledge of the master node. This may be advantageous in embodiments where a cluster of worker nodes is on the same server rack. In such cases, workload may be transferred between worker nodes on that rack, without having to create network traffic to transfer the workload to another rack.

As mentioned previously, roles may be reassigned within a federation cluster. For example, within federation cluster 110, director and leader roles may be reassigned to different master nodes within the master cluster 111. These master nodes may be on the same server rack or may be on different racks in different clusters. In some cases, the director may be monitoring the master nodes and may determine that a master node to which a leader role is assigned has become unavailable. In that case, that leader role will be failed over to another master node. Similarly, other master nodes may monitor the director and, upon determining that the director role has become unavailable, the director role may be failed over to another master node in the master cluster. In this manner, even if the master node on which the director is running fails, the director role is transferred to and run on another master node and the cluster federation moves forward. Such dynamic reassignment of roles provides a high level of fault tolerance and reliability for cluster-hosted services, applications and other workloads.

In some embodiments, the level of fault tolerance may be specified by an administrator 105 or other user. In some cases, the level of fault tolerance may be defined by a service level agreement (SLA). The SLA may, for example, specify that a certain number of master nodes or worker nodes are to be running at any given time. If the cluster federation falls below that number of master nodes, worker nodes, worker clusters, etc., the director will determine how many nodes or clusters need to be added to maintain the SLA. Accordingly, the director role may continually monitor whether sufficient master or worker nodes are available in the cluster federation 110 to maintain the fault tolerance SLA. The director role may also be configured to monitor whether sufficient master or worker nodes are available in the cluster federation 110 to maintain proper distribution across one or more fault domains. If the SLA-defined number of nodes is not running, the director may indicate that more master or worker nodes are to be instantiated. In some cases, this may involve moving excess master nodes to worker clusters or moving excess worker nodes to the master cluster, as will be explained below with regard to methods 300 and 400 of FIGS. 3 and 4.

FIG. 3 illustrates a flowchart of a method 300 for reassigning roles in a cluster federation. The method 300 will now be described with frequent reference to the components and data of environment 100.

Method 300 includes an act of determining that a master cluster in the cluster federation is to maintain a specified number of master nodes, the master nodes comprising computing nodes to which leader roles are assigned, the cluster federation including a master cluster and one or more worker clusters (act 310). For example, the determining module 109 of computer system 101 may determine that master cluster 111 is to maintain a certain number of master nodes, and that that number of master nodes is below the specified number of master nodes (act 320). The determining module 109 may further determine that at least one worker node in a worker cluster is available for reassignment as a master node (act 330). The role assigning module 108 may then reassign the determined worker node to a master node, such that the former worker node now functions as a master node (act 340).

Figure 5B:
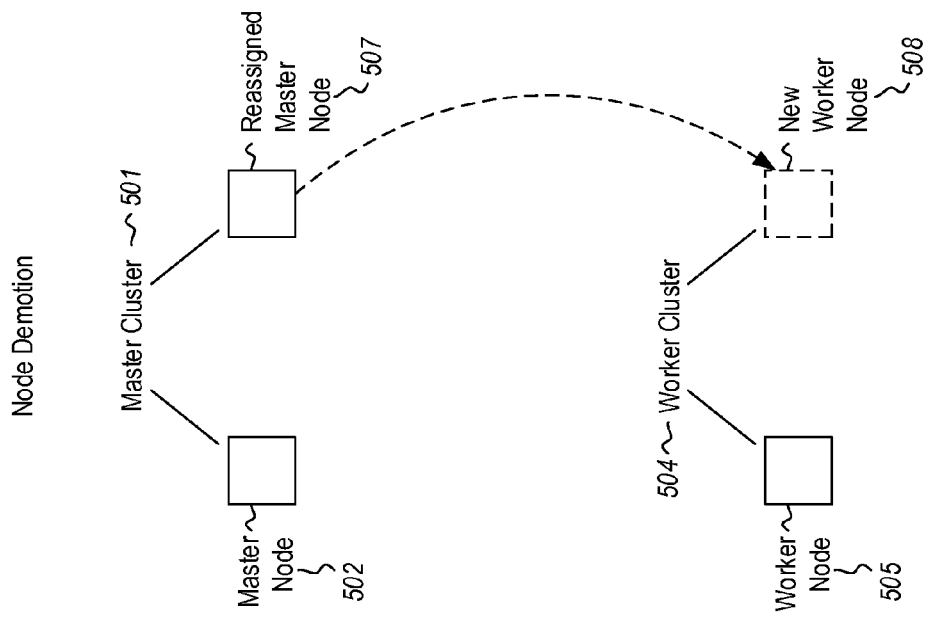
FIG. 5B illustrates an embodiment in which a master node is demoted to a worker node.
Figure 5A:
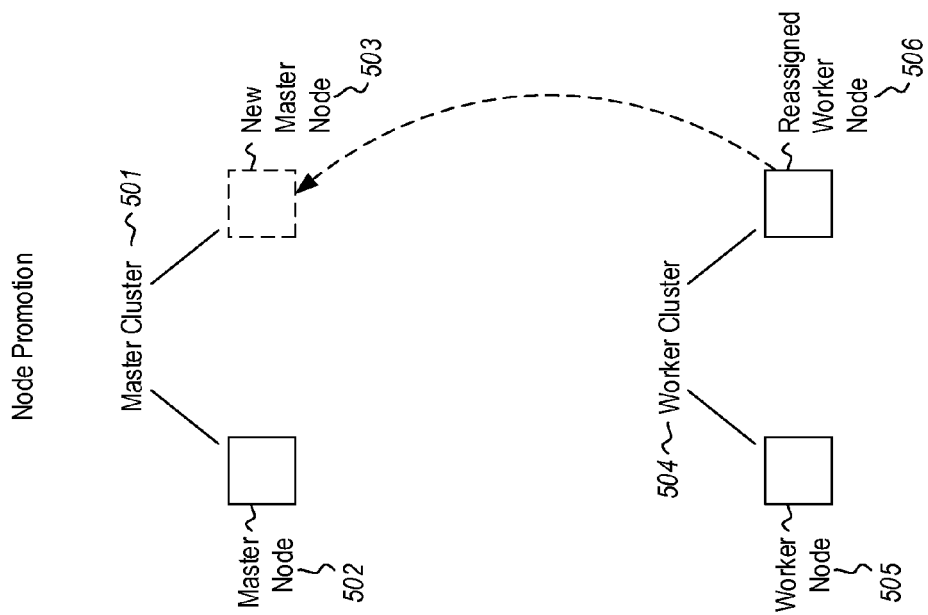
FIG. 5A illustrates an embodiment in which a worker node is promoted to a master node.

For example, as shown in FIG. 5A, a worker node may be promoted to be a master node within a master cluster. The worker cluster 504 includes two worker nodes (505 and 506), although it will be understood that the worker cluster may include substantially any number of worker nodes. As described above, the determining module 109 may determine that the master cluster 501 has too few nodes running, and may determine that worker cluster 504 can spare a worker node. Thus, worker node 506 may be reassigned to be part of master cluster 501. In this manner, master cluster gains master node 503, in addition to master node 502. The new master node may take on any master role (including a leader role or a director role), or as shown in FIG. 6A, may take on a worker role if needed.

In one embodiment, the determining module 109 may determine that a worker node that was reassigned to be a master node has become unhealthy for any of a variety of different reasons but is still able to process workloads. For instance, the node's network card may be functioning intermittently, or some of its random access memory may be corrupted or in a bad state, etc. In such cases, the node may be demoted back to being a worker node.

Figure 7:
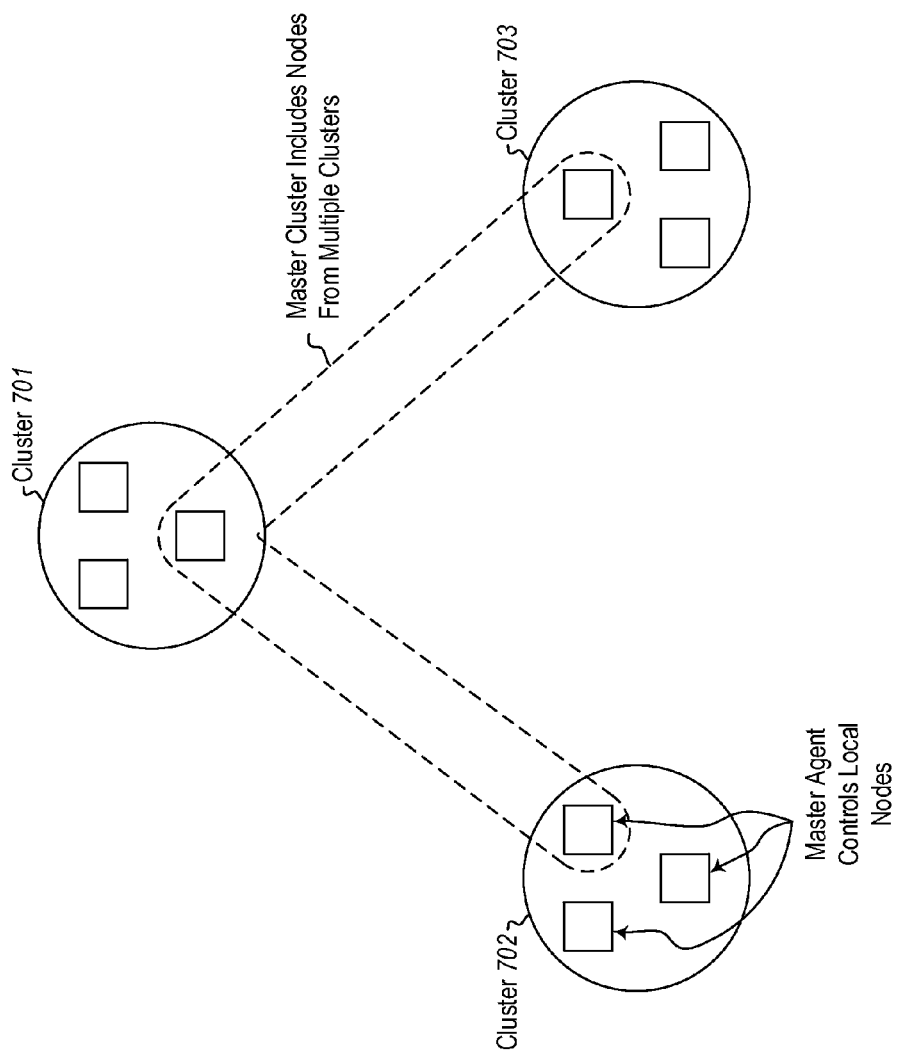
FIG. 7 illustrates an embodiment in which a master cluster spans multiple clusters.

In some embodiments, the worker cluster nodes 505 and 506 may be part of the same server rack, in addition to at least one master cluster node (e.g. 502). In such cases, the reassigned worker node 506 may be selected from worker nodes that are on the same hardware rack as the master node. The master nodes of the master cluster may be located on the same physical hardware rack, or on different racks, and may be located in different master clusters within the cluster federation (which may be in different geographic locations). As shown in FIG. 7, the master cluster encompassed by the dotted lines may include nodes from three (or more) different clusters. Thus, the master cluster includes nodes from clusters 701, 702 and 703. Each master node may include a master agent that controls the local nodes, as shown in cluster 702. Indeed, in some embodiments, each cluster shown in FIG. 7 is on its own server rack. Thus, the master cluster may include master nodes from different clusters which may be hosted on different hardware racks. In cases where SLAs are in place and where a master cluster has insufficient nodes running, computing nodes from other clusters may be reassigned to the master cluster to comply with the SLA.

FIG. 4 illustrates a flowchart of a method 400 for reassigning roles in a cluster federation. The method 400 will now be described with frequent reference to the components and data of environment 100.

Method 400 includes an act of determining that a worker cluster in the cluster federation is to maintain a specified number of worker nodes, the worker nodes comprising computing nodes to which worker roles are assigned, the cluster federation including a master cluster and one or more worker clusters (act 410). The determining module 109 of computer system 101 may determine that worker cluster 117 is to maintain a certain number of worker nodes and may further determine that the worker cluster is below that number of worker nodes (act 420). The determining module 109 may further determine that at least one master node in a master cluster 111 is available for reassignment as a worker node (act 430). Then, the role assigning module 108 may reassign the available master node to be a worker node, such that the former master node now functions as a worker node (act 440).

In the embodiment shown in FIG. 5B, master cluster 501 has master nodes 502 and 503. Worker cluster 504 is in need of another worker node and, as such, master node 507 is reassigned to be a worker node. Thus, in the end, worker cluster 504 has worker node 505 and new worker node 508. As shown in FIG. 6B, the new worker node may take on a master role if needed, or may perform the tasks of a worker role. In some cases, master agents may be implemented to record promotion and demotion decisions in a master cluster database. These may then be accessed by the director to ensure that the proper number of worker and master nodes is running at any given time. Still further, fault tolerant leader agents may be implemented which make independent decisions regarding node promotion and demotion within the scope of decisions that a particular leader agent is responsible for. Thus, a leader agent may determine that nodes within the worker cluster it manages are to be promoted to master nodes, or may determine that master nodes within its master cluster are to be demoted to worker nodes. In this manner, leaders may be implemented to keep a proper number of nodes in each master and/or worker cluster.

Accordingly, methods, systems and computer program products are provided which organize computing nodes in a cluster federation. Moreover, methods, systems and computer program products are provided which reassign roles in a cluster federation.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. At a computer system that includes at least one processor, a computer-implemented method for facilitating communication and maximizing an efficiency of directed work flow between computing nodes in a cluster federation, the method comprising:
   an act of identifying a plurality of computing nodes that are to be a part of the cluster federation, the cluster federation including a master cluster and a worker cluster, wherein the master cluster includes a first master node and a second master node, and wherein the worker cluster includes a worker node;
   an act of assigning a director role to the first master node, which first master node is included in the master cluster, wherein the first master node, after being assigned the director role, governs decisions that affect consistency within the cluster federation;
   an act of assigning a leader role to the second master node, which second master node is also included in the master cluster, wherein the second master node, after being assigned the leader role, monitors and controls the worker node in the worker cluster, whereby the master cluster includes the first master node having the director role and the second master node having the leader role, the first master node being different than the second master node, the director role being different than the leader role;
   an act of maintaining a partitioned database that is usable to facilitate communication between the first master node and the second master node, wherein any particular entry in the partitioned database is changeable by only one node included within the master cluster such that the communication between the first master node and the second master node occurs without acquiring a database lock;
   an act of assigning a worker agent role to the worker node, wherein the worker node, after being assigned the worker agent role, receives and processes workload assignments from the master cluster; and
   after waiting a predetermined time interval during which a status update from the worker agent role is not received, an act of the leader role communicating to the director role a failure of the worker agent role by recording the failure in the partitioned database, whereby the leader role communicates workload failures to the director role via the partitioned database.

2. The method of claim 1, wherein the master cluster comprises a plurality of master agents running on one or more selected worker clusters.

3. The method of claim 1, wherein the worker node is configured to store assigned workloads such that the worker node continues to operate even when the master cluster is unavailable.

4. The method of claim 1, wherein one or more workload assignments are hosted on the second master node in the master cluster.

5. The method of claim 1, wherein a functionality of at least some nodes that are included within the master cluster is distributed among a plurality of master nodes in the master cluster.

6. The method of claim 5, wherein the functionality is distributed along physical hardware boundaries to reduce network traffic between computing systems.

7. The method of claim 1, wherein the worker node, after being assigned the worker agent role, communicates with a master agent on behalf of the worker cluster, and wherein the communication between the worker node and the master agent includes providing workload assignment status updates and receiving additional workload assignments.

8. The method of claim 1, wherein the cluster federation allows master nodes to host worker agents and further allows worker nodes to host master agents.

9. The method of claim 1, wherein worker nodes in the worker cluster transfer assigned workloads between other worker nodes in the worker cluster, such that inter-cluster workload transfers are performed without the master node having knowledge of the inter-cluster workload transfers.

10. The method of claim 1, further comprising:
an act of determining that the first master node, after being assigned the director role, has become unavailable; and
an act of failing over to a third master node in the master cluster, such that the director role is transferred to and run on the third master node.

11. The method of claim 1, wherein the first master node, after being assigned the director role, determines whether sufficient master or worker nodes are available in the cluster federation to maintain a fault tolerance service level agreement (SLA).

12. At a computer system that includes at least one processor, a computer-implemented method for facilitating communication and maximizing an efficiency when reassigning roles in a cluster federation, the method comprising:
an act of identifying a cluster federation that includes a master cluster and a worker cluster, wherein the master cluster includes a plurality of master nodes that each have corresponding master node functionalities, and wherein the worker cluster includes a worker node, wherein a first master node and a second master node are included in the plurality of master nodes, the first master node being assigned a director role, the second master node being assigned a leader role, whereby the master cluster includes both the first master node having the director role and the second master node having the leader role, the first master node being different than the second master node, the director role being different than the leader role;
an act of maintaining a partitioned database that is usable to facilitate communication between at least two master nodes included within the plurality, wherein any particular entry in the partitioned database is changeable by only one master node included within the plurality such that the communication between the at least two master nodes occurs without acquiring a database lock;
an act of setting a policy requirement for the cluster federation, wherein the policy requirement at least requires that the cluster federation maintain a specified number of master nodes in the master cluster;
an act of determining that a current number of master nodes included within the master cluster is below the specified number of master nodes such that the cluster federation is not meeting the policy requirement;
an act of determining that the worker node is available for reassignment;
an act of reassigning the worker node to become a new master node, such that the worker node, after being reassigned to become the new master node, adopts the master node functionalities;
an act of the new master node transmitting a workload assignment to a worker agent role in the worker cluster; and
after waiting a predetermined time interval during which a status update from the worker agent role is not received, an act of the new master node communicating a failure of the worker agent role by recording the failure in the partitioned database, whereby the new master node communicates workload failures via the partitioned database.

13. The method of claim 12, further comprising:
an act of determining that the worker node, after being reassigned to become the new master node, has become unhealthy; and
an act of demoting the new master node to become a new worker node.

14. The method of claim 12, wherein the worker node is selected from a plurality of worker nodes that are within a same hardware rack as the first and second master nodes.

15. The method of claim 12, wherein determining that the current number of master nodes included within the master cluster is below the specified number of master nodes comprises determining that the current number of master nodes is lower than a number that is specified by a service level agreement (SLA), and wherein the reassignment of the worker node to become the new master node complies with requirements of the SLA.

16. The method of claim 12, wherein the master cluster is geographically distributed over a plurality of federation clusters.

17. A computer system comprising the following:
one or more processors; and
one or more computer-readable storage media having stored thereon computer-executable instructions that are executable by the one or more processors and that cause the computer system to perform a method for facilitating communication and maximizing an efficiency when reassigning roles in a cluster federation, the method comprising the following:
an act of identifying a cluster federation that includes a master cluster and a worker cluster, wherein the master cluster includes a plurality of master nodes that each include corresponding master node functionalities, and wherein the worker cluster includes a worker node with corresponding worker node functionalities, wherein a first master node and a second master node are included in the plurality of master nodes, the first master node being assigned a director role, the second master node being assigned a leader role, whereby the master cluster includes both the first master node having the director role and the second master node having the leader role, the first master node being different than the second master node, the director role being different than the leader role;
an act of maintaining a partitioned database that is usable to facilitate communication between at least two master nodes included within the plurality, wherein any particular entry in the partitioned database is changeable by only one master node included within the plurality such that the communication between the at least two master nodes occurs without acquiring a database lock;
an act of setting a policy requirement for the cluster federation, wherein the policy requirement at least requires that the cluster federation maintain a specified number of worker nodes in the worker cluster;
an act of determining that a current number of worker nodes included within the worker cluster is below the specified number of worker nodes such that the cluster federation is not meeting the policy requirement;

an act of determining that at least one master node in the plurality of master nodes is available for reassignment;

an act of reassigning the at least one master node to become a new worker node, such that the at least one master node, after being reassigned to become the new worker node, adopts the worker node functionalities;

an act of a different master node transmitting a workload assignment to the new worker node; and after waiting a predetermined time interval during which a status update from the new worker node is not received, an act of the different master node communicating a failure of the new worker node by recording the failure in the partitioned database, whereby the different master node communicates workload failures via the partitioned database.

18. The computer system of claim 17, wherein the method further comprises:

an act of implementing a plurality of fault tolerant leader agents that are configured to make independent decisions regarding node promotion and demotion within a scope of decisions that a particular leader agent is responsible for.

19. The computer system of claim 17, wherein the method further comprises:

an act of implementing one or more master agents that are configured to record promotion and demotion decisions in the partitioned database.

20. The computer system of claim 17, wherein determining that the at least one master node is available for reassignment comprises:

identifying that the at least one master node has available processing resources such that the at least one master node is characterized as being light on work.

21. The computer system of claim 17, wherein the master cluster is configured to issue a notification upon detecting that one or more master nodes in the master cluster are undergoing a down event or an up event, the notification being issued by the master cluster and being delivered to the first master node that was assigned the director role.

* * * * *